United States Patent
Zlatintsis

(10) Patent No.: US 10,704,705 B2
(45) Date of Patent: Jul. 7, 2020

(54) VALVE FOR SWITCHING FLUIDS, EXTINGUISHING SYSTEM AND METHOD

(71) Applicant: Minimax GmbH & Co. KG, Bad Oldesloe (DE)

(72) Inventor: Chrysafis Zlatintsis, Luebeck (DE)

(73) Assignee: Minimax GmbH & Co. KG, Bad Oldesloe (DE)

(*) Notice: Subject to any disclaimer, the term of this patent is extended or adjusted under 35 U.S.C. 154(b) by 11 days.

(21) Appl. No.: 15/553,474

(22) PCT Filed: Jan. 27, 2016

(86) PCT No.: PCT/EP2016/051659
§ 371 (c)(1),
(2) Date: Aug. 24, 2017

(87) PCT Pub. No.: WO2016/134909
PCT Pub. Date: Sep. 1, 2016

(65) Prior Publication Data
US 2018/0245709 A1    Aug. 30, 2018

(30) Foreign Application Priority Data
Feb. 26, 2015   (DE) ................ 10 2015 203 486

(51) Int. Cl.
*F16K 31/08* (2006.01)
*F16K 37/00* (2006.01)
(Continued)

(52) U.S. Cl.
CPC ............. *F16K 31/082* (2013.01); *F16K 1/42* (2013.01); *F16K 31/0675* (2013.01);
(Continued)

(58) Field of Classification Search
CPC .. F16K 31/082; F16K 37/0066; F16K 31/363; F16K 31/406; F16K 37/0041;
(Continued)

(56) References Cited

U.S. PATENT DOCUMENTS

| | | | |
|---|---|---|---|
| 1,961,599 A | 6/1934 | Schwitzer et al. | |
| 2,629,401 A * | 2/1953 | Miller | F16K 47/023 251/30.03 |

(Continued)

FOREIGN PATENT DOCUMENTS

| | | |
|---|---|---|
| DE | 10324091 A1 | 12/2003 |
| DE | 102012207986 A1 | 11/2013 |

(Continued)

OTHER PUBLICATIONS

German Office Action dated Aug. 30, 2018 (corresponding to DE 10 2015 203 486.0).

*Primary Examiner* — John Bastianelli
(74) *Attorney, Agent, or Firm* — Perkins Coie LLP

(57) ABSTRACT

A sectional valve includes a working valve and a control valve, which controls the working valve. In order to permit a greater flexibility with respect to possible settings and/or use or operation by comparison to known solutions, it is proposed, for example, that the control valve have a control spring (34, 34'), which presses the anchor (5) onto the control valve seat (17), and against which the control coil (26) lifts the anchor (5) from the control valve seat (17), a permanent magnet (29), which in an actuation state is configured to hold the anchor (5) lifted from the control valve seat (17) by the core (35), and a magnet holder (28), in and/or on which the permanent magnet (29) is held in the actuation state, and which permits a distance from the permanent magnet (29), and/or that the control valve is configured to variably position the core (35) along a force generated by the control spring (34, 34').

17 Claims, 3 Drawing Sheets

(51) Int. Cl.
*F16K 1/42* (2006.01)
*F16K 31/06* (2006.01)
*F16K 31/40* (2006.01)
*F16K 31/363* (2006.01)

(52) U.S. Cl.
CPC .......... *F16K 31/363* (2013.01); *F16K 31/406* (2013.01); *F16K 37/0008* (2013.01); *F16K 37/0041* (2013.01); *F16K 37/0066* (2013.01)

(58) Field of Classification Search
CPC .... F16K 31/0675; F16K 1/42; F16K 37/0008; F16K 31/40; F16K 31/08; F16K 31/05; A62C 35/68
USPC .............. 251/30.01–30.05, 65, 129.18, 359; 137/557; 335/253, 229–230, 234
See application file for complete search history.

(56) References Cited

U.S. PATENT DOCUMENTS

| | | | | |
|---|---|---|---|---|
| 3,458,769 | A * | 7/1969 | Stampfli | H01F 7/1615 361/147 |
| 5,178,366 | A * | 1/1993 | Kojima | F16K 1/36 251/174 |
| 5,497,135 | A * | 3/1996 | Wisskirchen | H01F 7/1615 335/253 |
| 5,655,747 | A * | 8/1997 | Pasut | A01G 25/165 251/30.03 |
| 5,915,665 | A * | 6/1999 | Paese | E03C 1/04 251/30.04 |
| 6,000,674 | A * | 12/1999 | Cheng | E03D 3/06 137/545 |
| 6,318,407 | B1 * | 11/2001 | Kohn | F16K 1/304 137/557 |
| 6,547,211 | B2 * | 4/2003 | Roman | F16K 31/402 251/129.15 |
| 6,959,904 | B2 * | 11/2005 | Beraldo | F16K 31/082 251/30.03 |
| 2007/0241298 | A1 | 10/2007 | Herbert et al. | |
| 2009/0179165 | A1 * | 7/2009 | Parsons | A01G 25/16 251/129.04 |

FOREIGN PATENT DOCUMENTS

| | | |
|---|---|---|
| EP | 0340625 B1 | 10/1993 |
| EP | 0710790 B1 | 5/2002 |
| FR | 1238863 A | 8/1960 |
| FR | 2990491 A3 | 11/2013 |
| GB | 544524 A | 4/1942 |
| WO | 9320370 A1 | 10/1993 |
| WO | 94/23435 A1 | 10/1994 |
| WO | 0037839 A1 | 6/2000 |
| WO | 2006110149 A1 | 10/2006 |

\* cited by examiner

VALVE FOR SWITCHING FLUIDS, EXTINGUISHING SYSTEM AND METHOD

CROSS-REFERENCE TO RELATED APPLICATIONS

This application is a National Stage of International Application No. PCT/EP2016/051659, filed Jan. 27, 2016 (now WO 2016/134909A1), which claims priority to German Application No. 10 2015 203 486.0, filed Feb. 26, 2015. The entire disclosures of each of the above applications are incorporated herein by reference.

FIELD

The present disclosure relates to a valve for switching fluids, in particular a sectional valve for an extinguishing agent line, an extinguishing system with such a valve, and a method for controlling a valve for switching fluids, in particular a sectional valve for an extinguishing agent line.

BACKGROUND AND SUMMARY

For example, solenoid valves, which use a permanent magnet, with which a piston or anchor of the valve is held in a predetermined position, are known from DE 103 24 091 A1, EP 0 340 625 B1, EP 0 710 790 B1 and WO 94/23435 A1.

The solenoid valves described in these documents all share in common that their structure only allows a slight flexibility in terms of possible settings, and virtually no flexibility with respect to their use or operation.

During the application of solenoid valves from DE 103 24 091 A1, EP 0 340 625 B1, EP 0 710 790 B1 and WO 94/23435 A1, for example, there is no way to manually open or manually close the valve, since an electrical pulse on a coil provided for this purpose must be generated for respectively moving the piston or anchor into a position in which the valve is closed, and/or a position in which the valve is open. Given a valve that in this way requires power or energy to be opened, operation is thus not possible in the event of a power or energy outage. The ramifications of a power or energy outage are especially critical in particular in the field of extinguishing technology.

In addition, the structural design determines the force to be applied by the coils to move the piston or anchor, and thus the minimum electrical current to be conducted by the coils. This is disadvantageous, in that limitations are placed on the possible actuation, making it harder to replace a valve with another valve having another current requirement. It is possible to provide a separate actuation for a respective valve that provides the necessary minimum current. However, this constitutes an additional outlay, which affects the costs of the valve on the one hand, and poses an additional vulnerability to failure on the other. Various models could be provided already while configuring the basic valve, which are geared toward the respective standard. However, this is associated with a diversification of the manufacturing process, which also leads to increased costs, especially since limits are still placed on application even given a range of standards.

In light of the above, the object of the present disclosure is to provide a valve for switching fluids, in particular a sectional valve for an extinguishing agent line, which by comparison to the known solutions has a greater flexibility with respect to possible settings and/or use or operation. The disclosure is also geared toward a corresponding extinguishing system and a method for controlling such a valve, in particular such a sectional valve, for an extinguishing agent line.

A sectional valve is here understood as a valve in an extinguishing agent line with which a portion of the extinguishing agent line in which pressurized extinguishing agent is present is separated from an unpressurized portion of the extinguishing agent line (that can also transition directly into an end of the extinguishing agent line). Extinguishing agents can be present in the unpressurized portion of the extinguishing agent line, wherein this portion can also be empty (e.g., filled with air).

A first aspect of the disclosure proposes a valve for switching fluids, in particular a sectional valve for an extinguishing agent line, with a control valve and a working valve, which is designed for pilot control by the control valve, with a throttle bore that establishes a first fluid connection between an inlet of the valve to be pressurized and a piston chamber of the working valve, and a working piston with a first end face opposite the piston chamber that is larger than a second end face opposite the inlet, wherein the control valve is configured to open and close a second fluid connection between the piston chamber and an outlet of the valve, wherein the control valve further has: a control valve seat, an anchor that closes the second fluid connection together with the control valve seat when pressed onto the control valve seat, a magnetizable core and a control coil configured to exert a magnetic force on the anchor, such that the control coil lifts the anchor from the control valve seat to an extent that the second fluid connection allows a greater flow than the first fluid connection, wherein the control valve has a) a control spring, which presses the anchor onto the control valve seat, and against which the control coil lifts the anchor from the control valve seat, a permanent magnet, which in an actuation state is configured to hold the anchor lifted from the control valve seat by means of the core, and a magnet holder, in and/or on which the permanent magnet is held in the actuation state, and which permits a distance from the permanent magnet, and/or b) a permanent magnet, which presses the anchor onto the control valve seat by means of the core, and against the retaining effect of which the control coil lifts the anchor from the control valve seat, a control spring, which in an actuation state is configured to hold the anchor lifted off of the control valve seat, and a magnet holder, in and/or on which the permanent magnet is held, and which allows a distance from the permanent magnet for a transition into the actuation state, and/or wherein the control valve is configured to variably position the core along a force generated by the control spring.

A further aspect of the disclosure proposes an extinguishing system with an extinguishing agent line and a valve according to the disclosure.

Another aspect of the disclosure proposes a method for controlling a valve for switching fluids, in particular a sectional valve for an extinguishing agent line, wherein the valve has a control valve and a working valve, which is configured for pilot control by the control valve, with a throttle bore that establishes a first fluid connection between an inlet of the valve to be pressurized and a piston chamber of the working valve, and a working piston with a first end face opposite the piston chamber that is larger than a second end face opposite the inlet, wherein the control valve further has: a control valve seat, an anchor that closes the second fluid connection between the piston chamber and an outlet of the valve together with the control valve seat when pressed onto the control valve seat, a magnetizable core and a control coil configured to exert a magnetic force on the anchor, wherein the control valve is used to open and close the second fluid connection, wherein the anchor is lifted from the control valve seat during the opening process to an extent that the second fluid connection allows a greater flow than the first fluid connection, wherein a) in an actuation state, the anchor lifted from the control valve seat against a control spring that presses the anchor onto the control valve seat is held by means of the core via a permanent magnet, wherein the permanent magnet in the actuation state is held in and/or on a magnet holder, wherein the permanent magnet is removed to end the actuation state, and/or b) before an actuation state, the anchor is pressed onto the control valve seat by means of the core via a permanent magnet, wherein the control coil is configured to lift the anchor from the control valve seat against a retaining effect of the permanent magnet, wherein the permanent magnet is held in and/or on a magnet holder, and the permanent magnet is removed for transitioning into the actuation state, wherein in the actuation state, the anchor lifted from the control valve seat is held by a control spring, and/or with a step of setting a force to be applied by the control coil to achieve the actuation state by variably positioning the core along a force generated by the control spring.

In the present conjunction, "pressing the anchor onto the control valve seat" is understood as brining the anchor and control valve seat into contact, such that the anchor and control valve seat together close the second fluid connection. The term "pressing" here relates to producing a sealing pressing force between the anchor and control valve seat, and must here not be construed as being limited only to arranging the anchor between the pressing element and the control valve seat, and as the force acting on the anchor being directed toward the control valve seat, since the compression force, and hence the desired seal, can also be achieved by pulling the anchor into the control valve seat, i.e., given a suitable arrangement where a force acts on the anchor that is directed away from the control valve seat (see FIG. 2 of EP 0 710 790 B1).

On the one hand, the disclosure is based on the knowledge that the ability to remove the permanent magnet from the valve (or its functional location on the valve) is associated with manually switching the valve. If the permanent magnet serves to hold the anchor in the actuation state (i.e., in a state in which the sectional valve was actuated and is open), this actuation state can be canceled by removing the permanent magnet, so that the valve closes. By contrast, if the permanent magnet keeps the valve closed, removing the permanent magnet can yield a triggering in an actuation state. Given a suitable structural design of the sectional valve, it is also possible to combine these variants with each other.

On the other hand, it was recognized that a variable positionability of the core relative to its penetration depth brings with it a variable lift of the anchor, which can be used to adjust the desired or required attraction force of the control coil, since the acting magnetic force of the coil depends on the relative position of the control coil and anchor.

The control spring here acts indirectly or directly between the core and anchor, wherein the function of the control valve in terms of opening and closing the second fluid connection is only associated with a movement of the anchor, wherein the core remains at least essentially in its (variably adjustable) position.

The valve according to the disclosure is preferably provided as a sectional valve for an extinguishing agent line, so that the sectional valve is preferably configured for a pressure of the extinguishing agent in the inlet ranging from 5 to 400 bar, particularly preferably ranging from 10 to 140 bar.

Removing the permanent magnet must not be understood to mean that the permanent magnet would thus necessarily have to be completely separated from the remaining valve. For removal purposes, it is enough that the permanent magnet be removed from its normal position, in which it acts on the core (and hence possibly indirectly on the anchor), to a point where the effect of the permanent magnet is practically eliminated or at least reduced to under a threshold that equates to an elimination. For example, if the permanent magnet holds the anchor via the core against the force of the control spring, removing the permanent magnet is to be understood as moving the permanent magnet away from the core until the force of the control springs exceeds the retaining force exerted by the magnet on the anchor. Even if the permanent magnet is completely removed from the magnet holder, the permanent magnet can still be coupled with the valve as such, for example by means of a loss prevention device.

In an embodiment of the disclosure, the control valve is configured to generate a releasing magnetic field, which counteracts a retaining effect of the permanent magnet, wherein the control coil and/or a releasing coil are provided for generating the releasing magnetic field.

The releasing magnetic field can have a force effect that acts on the anchor in a region spatially separate from the permanent magnet on the one hand, and also act to weaken the magnetic field of the permanent magnet on the other (i.e., overlap the magnetic field of the permanent magnet and possibly even extinguish it). In this way, the releasing magnetic field can be used to control the valve. It is here possible to also use the control coil for generating the releasing magnetic field, even given a reversed direction of flow.

In a configuration of the above embodiment, the releasing coil is provided in the magnet holder.

Given a releasing coil provided in the magnet holder, actuating (i.e., applying a current to) the releasing coil makes it possible to influence the effect of the permanent magnet, so that its effect is selectively eliminated or at least diminished to the extent necessary.

In another embodiment in which the valve has the permanent magnet and magnet holder, the magnet holder is removable.

It is not necessarily the case that the permanent magnet is removed out of or from the magnet holder or shifted inside of the magnet holder for removal purposes, since the magnet holder itself or at least a portion thereof can be removable in design. It is also possible both that the magnet holder can be removable, and that the magnet can be removed out of or from the magnet holder.

In another embodiment in which the variable positionability of the core is present, the core is screwed, latched, clamped, bonded and/or positioned with spacers into a guide bushing of the control valve.

The guide bushing of the control valve ensures a desired positioning of the core along a (longitudinal) axis defined by the force generated by the control spring, wherein the core can be positioned at various locations (continuously or incrementally) along this axis, for example to bring the lift of the anchor to a desired level in this way.

It can here be provided that, once a desired position has been set, the core is fixed in this position, for example by welding, bonding, soldering, wedging, countering or in some other suitable way.

In one configuration of the present embodiment, the anchor can be lifted off of the control valve seat by partially unscrewing or loosening the core from the guide bush.

If the variable positionability of the core is retained in the use state of the valve, the position of the anchor can also be influenced, in that the anchor is entrained by the core when being unscrewed or otherwise moved out of the guide bush, and thereby lifted off of the control valve seat. This provides another way of manually operating the valve.

In another configuration, the control valve is designed to screw and/or latch the core into the guide bushing with the permanent magnet held in and/or on the magnet holder, and subsequently lift the anchor held by the permanent magnet via the core from the control valve seat.

The combination of permanent magnet and core must be brought close enough to the anchor for the magnetic force to outweigh the force of the control spring. Given a variable positionability of the core, the core (together with the permanent magnet) can initially be brought closer to the anchor, so that the anchor adheres to the magnetized core, so that the anchor can then be taken along given a countermovement of the core.

Also described here is a valve for switching fluids, in particular having the features in the present disclosure, with a working valve seat, into which the working piston can be pressed to separate the inlet and outlet, in particular by means of a working spring, wherein the working valve seat can be moved along the working direction of the piston (e.g., along a force generated by the working spring), wherein the working valve seat is configured to be exposed to a valve seat force and follow the movement of the working piston with the working piston pressed into the working valve seat, at least with the inlet pressurized and the working valve closed.

The valve described here preferably has features that are indicated and explained further above and with reference to the exemplary embodiments regarding the control valve. However, the features of the working valve enumerated here can be regarded as an independent disclosure taken separately, so that the valve described here could also be configured with a control valve or the like that does not have the features enumerated in the present disclosure.

Described here in particular is a valve for switching fluids, in particular a sectional valve for an extinguishing agent line, with: an inlet to be pressurized and an outlet, a working piston that can be moved along a working direction, and a working valve seat, wherein the working piston and working valve seat are together configured to open and close at least one direct fluid connection between the inlet and outlet, wherein the valve is configured at least to close the fluid connection for exposing the working piston to a working piston force, wherein the working valve seat can be moved along the working direction, and the valve is configured at least to close the fluid connection for exposing the working valve seat to a valve seat force, wherein the working valve seat is configured to follow a movement of the working piston with the working piston pressed into the working valve seat, with the fluid connection closed and the inlet pressurized.

During the operation of an extinguishing system, for example, pressure surges can arise in the extinguishing agent, i.e., brief pressure spikes or rises. In a conventional valve with piston and valve seat, it may come about that the piston is briefly lifted from the valve seat during such a pressure spike, so that the valve at least briefly becomes permeable.

It has been recognized that such a behavior with a movable working valve seat can be suppressed or even eliminated, since the working valve seat follows the piston moved by the pressure surge, thereby at least reducing the undesired permeability of the valve.

In a configuration of the valve described above, the valve seat force can be produced by a working valve spring and/or a difference in area between an end face of the working valve seat relative to the working piston, and an end face of the working valve seat relative to the inlet.

In particular using an area difference to produce or support the valve seat force is advantageous, since a proportionality or at least a proportional percentage of valve seat force to the height of the pressure spike is here obtained, so that the valve seat force also increases given a higher pressure spike, allowing the working valve seat to follow the piston more quickly. The working valve spring can be advantageous if the applied pressure is (still) very low, so as to ensure a minimum force. Let it be noted that the "and/or" linkage in the preceding paragraph must be understood to mean that emphasis is thereby placed on three variants, specifically, first, that the valve seat force is produced by a combination of the effects of the working valve spring and area difference, second, that the valve seat force is produced by the effects of the working valve spring (without or even against the influence of an area difference), and third, that the valve seat force is produced by the effect of the area difference (or the differential pressure resulting therefrom) (without or possibly against a spring effect). However, it is here also not precluded that a suitable configuration of the valve can also be switched between these variants without any fundamental conversion of the valve (i.e., in particular during operation), even if an embodiment without this type of switching would be advantageous given the simpler structural design.

In a valve described here with a movable working valve seat, the movability of the working valve seat can be limited by the lifting range, in which the valve remains closed, wherein the lifting range can be comprised in particular of a respective stop above and below the end faces of the working valve seat.

In the movable working valve cylinder, a seal is advantageously arranged between the upper end face of the working valve seat and the end face of the working piston directed toward the inlet.

Further described here is a valve for switching fluids, in particular having the features in the present disclosure, and/or having the features listed here with respect to the working valve seat that can move along the force produced by the working spring, wherein the valve has a fluid flow signal generator with a bushing and a signal piston guided in the bushing with an outlet end face, to which a pressure prevailing in the outlet of the valve is applied, wherein the signal piston is held in a resting position by a signal spring in an unpressurized state, and a) the signal piston extends outwardly through the bushing, so that a position of the signal piston is discernible from outside, and/or b) the valve has a detection means for detecting a predetermined deviation of the signal piston from the resting position.

The valve described here preferably has features that were indicated and explained further above, both in general and with reference to the exemplary embodiments relating to the control valve, as well as those described here in relation to the movable working valve seat. However, the features of the fluid flow signal generator enumerated here can be regarded as an independent disclosure taken separately, so that the fluid flow signal generator described here could also be used in a valve for switching fluids, in particular a sectional valve, or the like which does not have the features enumerated in the present disclosure.

Described here in particular is a valve for switching fluids, in particular a sectional valve for an extinguishing agent line, with an inlet and an outlet, wherein a fluid conducting connection between the inlet and outlet is closed with the valve in a resting state, wherein the valve has a fluid flow signal generator with a bushing and a signal piston guided in the bushing with an outlet end face, to which the pressure prevailing in the outlet of the valve is applied, wherein the signal piston is held in a resting position by a signal spring in an unpressurized state, and a) the signal piston extends outwardly through the bushing, so that a position of the signal piston is discernible from outside, and/or b) the valve has a detection means for detecting a predetermined deviation of the signal piston from the resting position.

Conventional valves for switching fluids, such as sectional valves, do not provide for any integrated state representation, so that taking a look just at the inlet, valve and outlet area does not make it clear right away whether an actuation state (i.e., an open valve) is present. One way of arriving at a state representation is to display the signal used for actuation or show that the control signal was received. However, this does not yet ensure that this state representation also reflects the actual state, since even given a received actuation signal, a mechanical malfunction in the valve itself can prevent the working valve from actually being open.

The signal piston is exposed to the pressure inside of the valve outlet, and can used to easily realize such a state representation.

Let it be noted that the aforementioned bushing need not necessarily be a component separate from the valve body or the like. While the term "bushing" does also encompass this type of separate component built into the valve body or the like, it is also already realized by an opening (e.g., bore) in the valve body or housing of the valve. In other words, in the case of such an opening or bore, the housing of the valve or the valve body itself can be regarded as the bushing.

In a configuration of the described valve, the predetermined deviation is detected by a closing and/or opening of a mechanical, electrical, magnetic and/or optical contact given at least the predetermined deviation of the signal piston from the resting position.

Possible detection means include any elements or units with which the predetermined deviation can be detected, such as in particular mechanical or electromechanical switches, electrical contacts (contact between which is closed or opened by the deviation), reed contacts, Hall probes or light barriers.

In another configuration of the above valve, the signal piston has a seal relative to the bushing, which is located between the outlet and signal spring and/or in an outer wall of the bushing.

If the outlet is sealed relative to the signal spring, the signal spring is not exposed to the extinguishing means (or another fluid that flows through the valve and/or is present in the outlet), with a(n alternative or additional) seal also being possible between the signal piston and the bushing in the outer wall of the bushing.

In another configuration of the above valve, the signal piston, in particular given an unpressurized outlet, can be moved through exposure to an outside force in the direction of the outlet and/or opposite this direction to check the function.

A corresponding actuation from outside, for example by a user wishing to check the functionality of the signal piston and then indirectly of the valve as well, makes it possible to pull out the signal piston and/or press it into the valve, so that any blockage or other operational impairment can be recognized.

In another configuration of the valve, signal pistons and signal springs are dimensioned in such a way that the signal piston comes to abut against the bushing given a predetermined pressure in the outlet.

On the one hand, the abutment of the signal piston against the bushing can be used as an indication that the predetermined pressure was reached or is present, wherein a corresponding marking or designation can enable an easier recognition of the abutment. Just as any intermediate position, the abutment itself can in turn be detected by the detection means as an example of a predetermined deviation of the signal piston from a resting position.

On the other hand, if a corresponding seal or the like is provided in the area of the abutment, the abutment can also be used to achieve an additional sealing effect that is required or would be desirable above the predetermined pressure.

DRAWINGS

The disclosure will be described in greater detail below based on preferred exemplary embodiments, with reference to the attached drawings. Shown on:

DETAILED DESCRIPTION

A sectional valve according to the disclosure is described in the following discussion of the exemplary embodiments of the disclosure. Let it here be noted that the discussions of the flexible valve seat of the working valve and the signaling device are also to be understood as being independent of the details involving the control valve of the sectional valve, even if these explanations are described as preferred and advantageous exemplary embodiments of the disclosure.

The sectional valve discussed as an exemplary embodiment has a flexible working valve seat, and its control valve is configured as an pulse valve, in such a way that the valve remains open after an actuating signal (or pulse), even given an intermittent power failure.

The term "flexible working valve seat" is here to be understood in terms of a movability or displaceability of the working valve seat, and is not geared toward the working valve seat as such necessarily having to consist of an elastic material or the like. In the present context, the flexibility of the working valve seat lies in the fact that the sectional valve as a whole, and in particular the working valve seat, is configured so that the working valve seat is not rigidly fixed in one position, but can rather flexibly and movably follow the working piston.

The "resting state" of the sectional valve here refers to the state in which the extinguishing flow is not released, and no actuation signal (e.g., a fire alarm signal during use in a fire extinguishing system) is present or was present and still persists. By contrast, the "actuation state" is the state in which an actuation signal is present or was present and still persists, so as to release the extinguishing agent flow, i.e., establish a fluid guiding connection between the inlet (fluid inlet channel) and outlet (fluid outlet channel). In the present disclosure, the actuation state does not require that the actuation signal be continuously applied.

Figure 1:
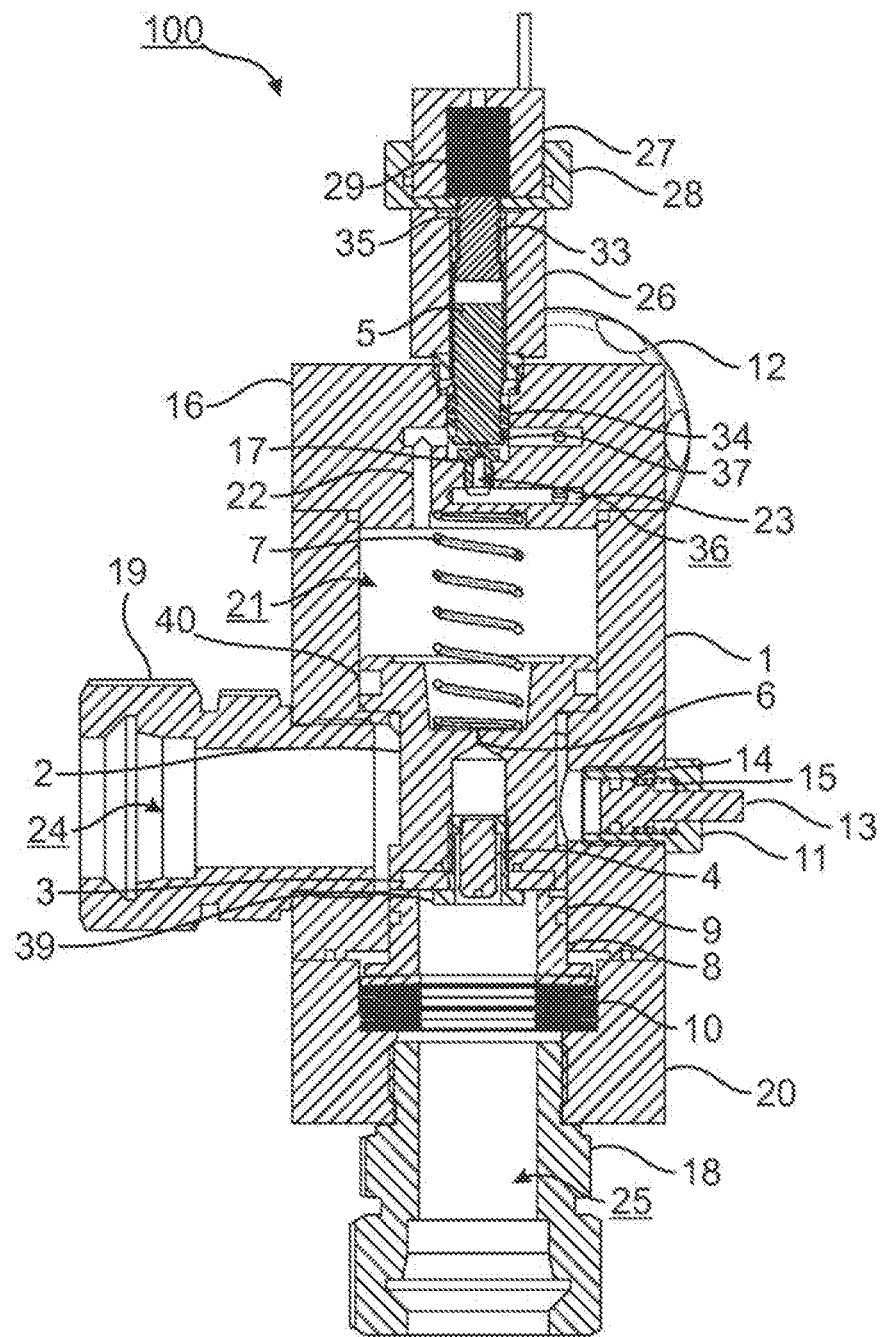
FIG. 1 is a first exemplary embodiment of a sectional valve according to the disclosure in a resting state.
Figure 2:
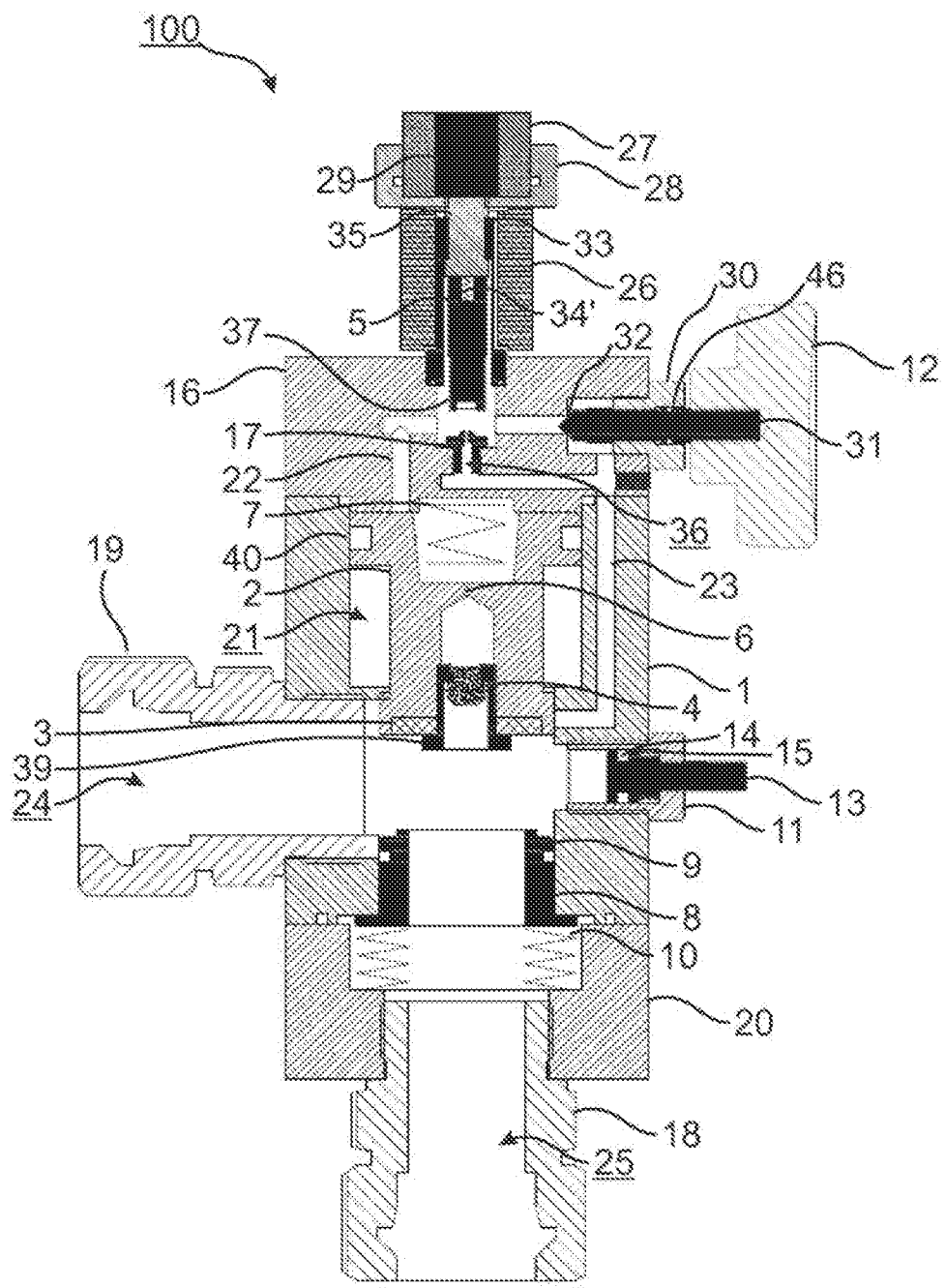
FIG. 2 is a second exemplary embodiment of a sectional valve according to the disclosure comparable to the one on FIG. 1 in the actuation state.

FIG. 1 shows a sectional valve 100 according to the disclosure in a resting state, while FIG. 2 shows a slightly different view of the sectional valve 100 predominantly modified in terms of its manual trigger in the actuation state.

In the first and second exemplary embodiments, the sectional valve 100 according to the disclosure encompasses four assemblies: a working valve with flexible working valve seat 8, a control valve, a fluid flow signal generator as the pressure display or indicator that the sectional valve is open, and a manual trigger.

The working valve comprises a valve body 1, a working piston 2 in a piston chamber 21 of the valve body, an upper valve cover 16, a lower valve cover 20, an inlet nozzle 18, an outlet nozzle 19, a working spring 7 designed as a compression spring, a pressure-retaining channel network 22 and a pressure-relieving channel network 23.

The upper and lower valve covers 16, 20 (the designations "lower" and "upper" only serve as a reference to the figures, and are not to be construed as a limitation) are secured watertight and gastight to the valve body 1 by means of screws (not shown).

The inlet nozzle 18 and the outlet nozzle 19 are each screwed into/flanged to the valve body 1.

The working piston 2 is guided in the piston chamber 21. A seal 40 seals the working piston 2 relative to the inner wall of the piston chamber 21.

Another seal 3 that interacts with the working valve seat 8 is mounted to the working piston 2 with an attachment bushing 39.

A throttle bore 6 having the smallest cross section of all bores present in the sectional valve connects the inlet 25 with the piston chamber 21 (and above the latter with a pressure-retaining channel network 22). A sieve device 4 is built into the attachment bushing 39, and used to prevent contaminants or the like from the feed line from clogging the throttle bore 8.

The valve body 1 and upper valve cover 16 are configured so as to have a pressure-retaining channel network 22 and a pressure-relieving channel network 23, which are separated in the non-actuated state, and fluidically connected with each other in the actuation state.

Suitable recesses in the upper valve cover 16 and in the working piston 2 hold and guide the working spring designed as a compression spring 7, which presses the working piston 2 onto the working valve seat 8.

The control valve comprises a control valve seat 17, a guide bushing 33, an anchor 5, a permanent magnet 29, a control coil 26 around the guide bushing 33, a releasing coil 27 around the permanent magnet 29, a magnet holder 28, a magnetizable core 35 made of magnetizable material, a control spring 34, 34' and an anchor seal 37 in the anchor 5.

FIG. 1 shows a variant in which the control spring 34 abuts against the upper valve cover 16 or a bushing of the control valve in the upper valve cover 16, while FIG. 2 shows a variant in which the control spring 34' is recessed into the anchor 5, and acts between the anchor 5 and core 35.

The guide bushing 33 is secured watertight/gastight in the upper valve cover 16, and guides the axial movement of the anchor 5. The core 35 is mounted watertight/gastight in the upper region of the guide bushing 33. The control coil 26 is mounted around the guide bushing 33, and is held by the magnet holder 28 screwed to the core 35 in a stable position between the magnet holder 28 and upper valve cover 16.

The magnet holder 28 retains the permanent magnet 29 and releasing coil 27. The core 35 is in physical contact with the permanent magnet 29, so that the permanent magnet 29 expands its magnetic field by the length of the core 35.

The control valve seat 17 has a bore 36, which is sealed onto the anchor 5 and seal 37 by the action of the control spring 34 configured as a compression spring. In the non-actuated state, the seal 37 thus separates the pressure-retaining channel network 22 from the pressure-relieving channel network 23, so that the second fluid connection (which here results from the combination of pressure-retaining channel network 22 and pressure-relieving channel network 23) is closed (i.e., not permeable to fluid).

The fluid flow signal generator encompasses a bushing 11, a signal piston 13, a seal 14 and a signal spring 15. The signal piston 13 is guided in the bushing 11, and sealed with the seal 14. The bushing 11 is mounted watertight/gastight in the valve body 1. The bushing is joined with the outlet 24 on the inlet side. If the outlet 24 is unpressurized (i.e., in the resting state), the signal spring 15 brings the signal piston 13 into its resting position.

The hand trigger comprises a threaded bushing 30, a threaded bolt 31 and a handle 12. The threaded bushing 30 is built watertight/gastight into the upper valve cover 16. The threaded bushing 30 is screwed into the threaded bushing 30, and sealed with the seal 46. The threaded bolt 30 is provided with a sealing cone 32, and the handle 12 is provided on the threaded bolt.

The hand trigger represents an option parallel to the control valve for establishing a fluid connection between the pressure-retaining channel network 22 and the pressure-relieving channel network 23. With the threaded bolt 30 completely screwed in, the sealing cone 32 (apart from the anchor seal 37) seals the channel network 22 away from the channel network 23.

The exemplary embodiments on FIGS. 1 and 2 differ primarily in how the hand trigger is arranged. As evident on FIG. 2, the hand trigger is there essentially arranged on the side of the valve 100 opposite the outlet nozzle 19, while a deviating variant is present in the exemplary embodiment shown on FIG. 1, in which the handle 12 (the other elements of the hand trigger are not further denoted or depicted separately on FIG. 1 for the sake of clarity) is arranged on a side of the valve 10 adjacent to the outlet nozzle, wherein the details relating to the pressure-relieving channel network 23 correspondingly also differ. However, since the expert is basically familiar with hand triggers of this type, there is no need for further explanations. Nonetheless, let it be noted that, because the pressure-relieving channel network 23 is guided differently, its connection to the piston chamber 21 is not shown on FIG. 1 (i.e., is present outside of the drawing plane).

The subassembly of the flexible valve seat comprises the working valve seat 8, a seal 9 and a working valve spring 10.

The subassembly 8 is guided in the valve body 1. The seal 9 provided between the working valve seat 8 and a wall of the valve body 1 seals this guide for the working valve seat 8. In the non-actuated state, the working valve seat 8 with the seal 3 seals the inlet 25 from the outlet 24, and separates the latter from each other. The working valve seat 8 has a range of movement between a complete compression of the working valve spring 10 and an abutment in the valve body 1. The flexibility of the working valve spring 10 makes it possible to lift the working valve seat 8 from the working piston 2 by a certain distance, or the working valve seat 8 can follow the working piston 2 until it comes to abut.

In the exemplary embodiments shown on FIGS. 1 and 2, the respective working valve is provided with the working valve spring 10, which applies the valve seat force that presses the working valve seat 8 onto the working piston 2 or prevents the working valve seat 8 from deflecting while pressing the working piston 2 into the working valve seat 8. Alternatively, it is also possible to produce the valve seat force in the operating state using an area difference between opposing end faces of a working valve seat (not depicted in this way here), which is guided in the valve body. In the operating state, a pressure is present in the inlet 25. If the end faces that are perpendicular to the longitudinal direction in which the working valve seat is guided, which are each exposed to the pressure prevailing in the inlet, vary in size, this yields a resultant differential force that can be used as the valve seat force. The size of the end face exposed to the pressure is to be understood as the size of a projected area produced by projecting the surfaces exposed to the pressure onto a plane perpendicular to the respective direction.

If the valve seat force is produced solely based on the area difference of the pressurized end faces, the working valve seat is preferably guided in the valve body in such a way that two abutments are present, a first abutment (as also discernible on FIGS. 1 and 2) that limits the extent to which the working valve seat runs after the working piston (since the sectional valve could otherwise not be opened), and a second abutment that lies opposite the first abutment, with which the guide path of the working valve seat in the valve body in the opposite direction is limited, so that the working valve seat is held in the valve body secured against loss. Under certain conditions, however, the second abutment can be omitted if concern over the working valve seat being lost were to be eliminated, for example because of other measures.

In each hydraulic system, undesired hydraulic shocks can arise for various reasons. These shocks can result in mechanical components of the system becoming loaded to such an extent that the latter malfunction. One example for a malfunction of a conventional sectional valve is when the piston is briefly lifted due to a shock, causing the sectional valve to open.

The job of the flexible working valve seat 8 is to compensate for the lifting of the working piston 2 as the result of shocks, and thus keep the sectional valve 100 closed to a desired degree of lift.

This is achieved by having the working valve seat 8 lag the working piston 2 by the desired degree through exposure to the force of the working spring 10, and further exert a compressive force on the seal 3, so that the sectional valve remains closed, and no fluid conducting connection exists between the inlet 25 and outlet 24.

As already discussed above, the advantage to the movable working valve seat 8 is that pressure fluctuations in the inlet 25 eliminate or greatly diminish the chance of the sectional valve 10 becoming permeable, since the working valve seat 8 follows the working piston 2 even given a pressure spike, and thereby maintains a closed state of the sectional valve 100.

When using the sectional valve in a water extinguishing system (an extinguishing system with water or water-based extinguishing agent as the fluid), the pipe network (not shown) is divided into protective regions, wherein each region is separated by at least one valve (then also referred to as a selector valve). The extinguishing agent is usually guided from a supply location through a distribution line with such valves in various fire protection sections. When a pump dispatches fluid with a pressure $p_2$ plus a pressure spike in order to maintain the pressure $p_1$ applied (and desired) at the inlet in the resting state, it may happen in conventional sectional or selector valves that one or more non-actuated valves open. In the context of the present disclosure, this opening (at least for a pressure spike $\Delta_1$) is prevented by the movable working valve seat 8, even if the pressure surges constitute a multiple of the normal operating pressure.

For example, the pressure $p_1$ in the resting state can measure 140 bar, and is maintained by a resting pressure pump (regulation at approx. 2 bar).

In the resting state, the sectional valve 100 is closed. Pressure $p_1$ prevails in the inlet 25. Due to the fluid connection between the inlet 25 and piston chamber 21 provided by the throttle bore 6, the pressure $p_1$ thus also prevails in the piston chamber 21. As a result of the larger first active pressure surface of the working piston 2 arranged in the piston chamber 21, the working piston 2 is held in the resting position by the resultant force on the first active pressure surface, which is greater than the force on the second active pressure surface of the working piston 2 in the inlet 25. In this resting position, there is no fluid conducting connection between the inlet 25 and outlet 24.

In order for the sectional valve 100 to open, i.e., a fluid conducting connection to be established between the inlet 25 and outlet 24, the working piston 2 is lifted from its working valve seat 8. To this end, a pressure drop is created in the piston chamber 21, specifically by opening a second fluid connection via the control valve, which acts between the pressure-retaining channel network 22 (which is continuously connected with the piston chamber 21) and the pressure-relieving channel network 23 (which is continuously connected with the outlet 24, but can also lead to a separate reservoir independent of the outlet 24). To open the control valve, the anchor 5 is lifted from the control valve seat 17, thereby establishing a fluid connection between the channel networks 22 and 23.

According to the disclosure, the permanent magnet 29 is removable (preferably also replaceable). The control valve (in the form of a solenoid valve) is designed in such a way that it can be equipped with an anchor holding device (AH) or "anchor holding and control device" (AHS) according to a modular principle, wherein a conversion between AH and AHS is preferably possible.

The difference between AH and AHS lies in the fact that, by comparison to the simpler anchor holding device (not shown), the anchor holding and control device is equipped with an additional coil (releasing coil 27) to suppress the effect of the permanent magnet 29.

In a conventional solenoid valve (not shown) without an anchor holding device, the valve is only open when a strong enough current is flowing at the control coil, since the control spring presses the anchor onto the control valve seat in the absence of current flow. Therefore, a conventional solenoid valve without an anchor holding device is closed given a power failure or deactivated power. By contrast, the desire in fire protection technology is that the actuated sectional valves also still remain actuated after an extinguishing process has been introduced, even if energy supply can no longer be guaranteed owing to fire damage, so that the extinguishing process can continue to be ensured.

If the anchor holding device (i.e., here the permanent magnet 29 in the magnet holder 28) is provided, the anchor 5 remains adhered to the permanent magnet 29 (more precisely indirectly via the core 35) during the opening process (actuation state), so long as the current signal 26 provides for a sufficient lifting of the anchor 5 from the control valve seat 17 (or a sufficient approach by the anchor 5 to the core 35), i.e., the control valve remains open even given a power failure. During a mechanical (manual) removal of the permanent magnet 29 (for example, after extinguishing is complete), the control valve returns to the closed setting. The permanent magnet 29 here thus has the function of an anchor holding device (AH).

Beyond the configuration of an anchor holding device, the exemplary embodiments shown on FIGS. 1 and 2 also encompass the function of an anchor holding and control device.

As already the case with the anchor holding device, the anchor 5 in this version also adheres to the permanent magnet 29 (or the core 35 magnetized by the permanent magnet 29) initially after opening the valve, wherein manually removing the permanent magnet 29 also leads to a closing of the control valve. In addition, a current flow through the releasing coil 27 (switching signal "Valve closed") can generate a compensating magnetic field, which releases the anchor 5. (bi-stable solenoid valve). However, this valve remains in an open setting given a power failure here as well.

Another embodiment of the disclosure can also provide that the circumstances of the open setting and closed setting of the control valve be switched, so that this type of valve would be in the open setting in a resting state, and would be kept there by the magnet in a closed setting.

In the exemplary embodiments illustrated on FIGS. 1 and 2, the core 35 is screwed into the guide bushing 33, meaning that the core 35 can be (variably) positioned in any screw-in depth desired.

A tightness of the core 35 relative to the guide bushing 33 is here ensured by an O-ring seal (not shown), which is entrained in the core 35, regardless of the setting (screw-in depth) at which the core 35 is positioned in the guide bushing 33.

This property (core 35 has a variable screw-in depth) makes the lift of the anchor 5 variable as well. Since the magnetic force of the control coil 26 acts analogously to the position of the anchor 5, this means that the desired force of attraction can also be variably selected for the control coil by determining the anchor lift. This indirectly influences a determination of the bore size of the control valve seat 17, which the anchor 5 acts upon and seals via the hydraulic pressure, and the determination of the flow as a function of lift.

The sectional valve in the first and second exemplary embodiments encompasses a fluid flow signal generator. The assembly of the fluid flow signal generator (bushing 11, signal piston 13, seal 14, signal spring 15) has the function of signaling the fluid flow or pressure application upon release of the fluid conducting connection from the inlet 25 to the outlet 24. In a resting state, the signal piston 13 is in a resting position. In the actuation state (fluid flows), the pressure of the fluid on the end face of the signal piston 13 (opposite the force exerted by the signal spring 15) pushes the signal piston 13 into a signaling position.

One advantage to this mechanical fluid flow signal generator (that responds to a pushing or thrusting motion) lies in the ability to test the functionality from outside, without emptying the fluid-carrying components, by manually "pressing" (or pulling) the signal piston 13 (spring locked, spring defective due to breakage/corrosion).

In the non-actuated state schematically shown on FIG. 1, the operating pressure, e.g., 140 bar, acts in the inlet 25, in the throttle bore 6, in the piston chamber 21 and in the pressure-retaining channel network 22.

The outlet 24 is unpressurized when conventionally connected with pressure-relieving open nozzle pipe networks. In these exemplary embodiments, the pressure-relieving channel network 23 is connected with the outlet 24, thus making it unpressurized as well.

The working piston 2 presses the working valve seat 8 against the working valve spring by a lift, and seals the inlet 25 and outlet 24 from each other with the seal 3.

The active force exerted by the pressure in the pressure-retaining channel network 22 and the control spring 34 designed as a compression spring on the core 5 or anchor seal 37 seals the bore 36 of the control valve seat 17, so that the pressure-carrying channel network 22 and the pressure-relieving channel network 23 are separated from each other.

The signal piston 13 of the fluid flow signal generator is in its unpressurized resting position.

The sealing cone 32 seals or separates the pressure-retaining channel network 22 and the pressure-relieving channel network 23 from each other at a second location.

During fire detection in a fire section, for example, the control coil 26 is actuated via a control center (not shown) (for example, fire detector and/or extinguishing control center). The control coil 26 then generates a magnetic field, which moves the anchor 5 against the control spring 34 to abut against the core 35. The anchor 5 remains adhered to the core 35, even if power to the coil 26 was turned off.

Releasing the bore 36 causes the pressure to quickly dissipate from the piston chamber 21 via the then existing fluid connection comprised of the channel networks 22 and 23 to the unpressurized outlet 24, since the throttle bore is unable to allow the influx of extinguishing agent arriving through the fluid connection.

A resultant force in this way arises in the working piston, which allows the working piston 2 (and the working valve seat 8 that initially follows the piston) to move in the flow direction, until the working piston 2 finally exits the working valve seat 8 after the joint lifting, and eliminates the separation of fluid chambers 24 and 25. As a consequence, the sectional valve 100 is opened.

The signal piston 13 of the fluid flow signal generator is exposed to pressure, and pushed to abut against the bushing 11 against the spring force of the signal spring 15.

The power supply to the control coil 26 is turned off at the conclusion of the extinguishing process at the latest, which eliminates the magnetic field of the control coil 26.

At least one brief current pulse on the releasing coil 27 builds up a counteracting magnetic field around the permanent magnet 29, which eliminates or at least limits the retaining force of the permanent magnet 29 and core 35. The anchor 5 is thereby released, and the effect of the compression and spring force exerted by the control spring 34 causes the anchor 5 to close the bore 36.

The operating pressure in the piston chamber 21 is built up again through the throttle bore 6, the working piston 2 again moves toward the working valve seat 8, and presses the valve seat 8 one lift increment lower.

The sectional valve 100 is thus closed again.

The spring force exerted by the signal spring 15 returns the signal piston 13 to its resting position.

If necessary, the sectional valve 100 is manually actuated (here manually opened). Turning the handle 12 or threaded bolt 31 causes the sealing cone 32 to open the pressure-retaining channel network 22 to the pressure-relieving pressure channel network 23, and the valve opens as described above. Turning the handle in the opposite direction causes the sealing cone 32 to seal the pressure-retaining channel network 22 again, and the valve closes as described above.

Instead of the closing process described above involving the use of the releasing coil 37, the permanent magnet 29 itself can be removed far enough away from the core 35 that the force of the control spring 34, 34' predominates, and again moves the anchor 5 into the closed position.

It is likewise possible to use the control coil itself to generate the desired releasing magnetic field to offset/reduce the effect of the permanent magnet. This can be achieved by reversing the direction of current through the control coil by means of a suitable switch.

Figure 3:
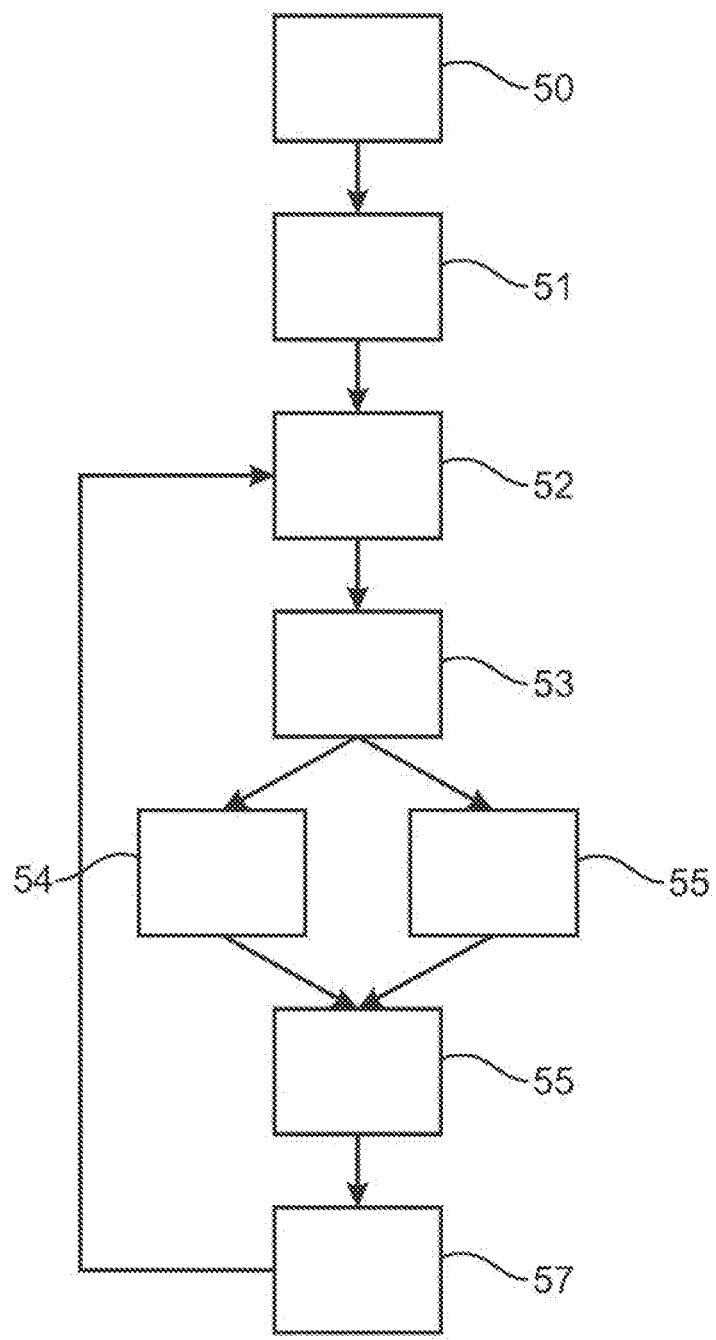
FIG. 3 is an exemplary embodiment of a method according to the disclosure for controlling a valve for switching fluids based on the example of a sectional valve.

FIG. 3 shows an exemplary embodiment of a method according to the disclosure for controlling a sectional valve for an extinguishing agent line.

Just as in the exemplary embodiments described above, for example, the sectional valve discussed here has a control valve and a working valve, which is configured for a pilot control by the control valve. The working valve comprises a throttle bore, which establishes a first fluid connection between a pressure-retaining inlet of the sectional valve and a piston chamber of the working valve, and a working piston, wherein a first end face of the working piston is larger in relation to the piston chamber than a second end face in relation to the inlet. The control valve further comprises a control valve seat, an anchor which, when pressed onto the control valve seat, together with the control valve seat closes a second fluid connection between the piston chamber and an outlet of the sectional valve, a magnetizable core and a control coil, which is configured to exert a magnetic force on the anchor.

The second fluid connection is opened and closed with the control valve, wherein the anchor is lifted from the control valve seat in the opening process to the point where the second fluid connection allows a greater flow than the first fluid connection.

In step 50, the sectional valve is provided, while in step 51, a force to be applied by the control coil to achieve the actuation state is set by variably positioning the core along a force produced by the control spring. This step 51 can be followed by (potentially permanently) fixing the position, for example by bonding or welding.

In step 52, the sectional valve is moved into the resting state. In this state, the control spring presses the anchor onto the control valve seat, so that the second fluid connection is closed.

In step 53, the control coil is supplied with current, so that the then acting magnetic force lifts the anchor from the control valve seat against the effect of the control spring, thereby opening the control valve.

In step 54, the control coil moves the anchor close enough to the core that the force exerted on the anchor by the permanent magnet via the core is large enough to hold the anchor in the lifted state against the control spring.

Parallel thereto in step 55, opening the second fluid connection leads to a drop in pressure in the piston chamber, so that the differential pressure between the piston chamber and inlet causes a force to act on the working piston that ultimately ensures the opening of the sectional valve, i.e., the opening of a connection between the inlet and outlet.

In step 56, the permanent magnet is removed from the sectional valve, so that the force countering the control spring is eliminated or at least sufficiently diminished, so that the control spring presses the anchor onto the control valve seat, thereby closing the second fluid connection.

Since extinguishing agent continues to flow through the throttle bore into the piston chamber, but no longer flows out through the second fluid connection, the pressure in the piston chamber (again) arises from the inlet in step 57, so that the varying end faces of the working piston now yield a resultant force that together with the working spring presses the working piston onto the working valve seat, thereby closing the sectional valve.

The resting state is thus reached once again, so that the process can be resumed at the appropriate time starting at step 52, for example, once the permanent magnet has been reset.

In an alternative or supplemental configuration, the anchor can be pressed onto the control valve seat by means of the core via the permanent magnet prior to the actuation state, wherein the control coil is configured to lift the anchor from the control valve seat against a retaining effect of the permanent magnet, wherein the permanent magnet is held in and/or on the magnet holder, and the permanent magnet is removed for a transition into the actuation state, wherein the anchor lifted from the control valve seat is held by a control spring in the actuation state.

| REFERENCE LIST | | |
|---|---|---|
| 1 | Valve body | |
| 2 | Working piston | |
| 3 | Seal | |
| 4 | Sieve device | |
| 5 | Anchor | |
| 6 | Throttle bore | |
| 7 | Working spring | (Compression spring) |
| 8 | Working valve seat | (Valve seat) |
| 9 | Seal | |
| 10 | Working valve spring | (Spring) |
| 11 | Bushing | |
| 12 | Handle | |
| 13 | Signal piston | (Piston) |
| 14 | Seal | (Sealing ring) |
| 15 | Signal spring | (Compression spring) |
| 16 | Upper valve cover | |
| 17 | Control valve seat | (Seat) |
| 18 | Inlet nozzle | |
| 19 | Outlet nozzle | |
| 20 | Lower valve cover | |
| 21 | Piston chamber | |
| 22, 23 | Second fluid connection | (Combination of pressure-retaining channel network + pressure-relieving channel network) |
| 24 | Outlet | (Fluid outlet channel) |
| 25 | Inlet | (Fluid inlet channel) |
| 26 | Control coil | (First coil) |
| 27 | Releasing coil | (Second coil) |
| 28 | Magnet holder | |
| 29 | Permanent magnet | |
| 30 | Threaded bushing | |
| 31 | Threaded bolt | |
| 33 | Guide bushing | |
| 34 | Control spring | (Compression spring) |
| 35 | Magnetizable core | |
| 36 | Bore of control valve seat | |
| 37 | Anchor seal | |
| 39 | Attachment bushing | |
| 40 | Seal | |
| 100 | Sectional valve | |

The invention claimed is:

1. A method for controlling a sectional valve (100) for an extinguishing agent line, wherein the valve (100) has a control valve and a working valve, which is configured for pilot control by the control valve, with a throttle bore (6) that establishes a first fluid connection between an inlet (25) of the valve (100) to be pressurized and a piston chamber (21) of the working valve, and a working piston (2) with a first end face disposed opposite the piston chamber that is larger than a second end face disposed opposite the inlet (25), wherein the control valve further has: a control valve seat (17), an anchor (5) that closes a second fluid connection (22, 23) between the piston chamber (21) and an outlet (24) of the valve (100) together with the control valve seat (17) when pressed onto the control valve seat (17), a magnetizable core (35) and a control coil (26) configured to exert a magnetic force on the anchor (5), wherein the control valve is used to open and close the second fluid connection (22, 23), wherein the anchor (5) is lifted from the control valve seat (17) during the opening process to an extent that the second fluid connection allows (22, 23) a greater flow than the first fluid connection, the method comprising:

setting a force to be applied by the control coil (26) to achieve an actuation state by variably positioning the core (35) along a longitudinal axis defined by a force generated by a control spring (34, 34), maintaining the actuation state by having a permanent magnet (29) positioned proximate the core (35) during the absence of the force applied by the control coil (26), and terminating the actuation state by removal of the permanent magnet (29) from the proximity of the core (35) during the absence of the force applied by the coil, in which the control spring (34, 34') presses the anchor onto the control valve seat (17).

2. A sectional valve (100) for an extinguishing agent line, with:

a control valve and a working valve for pilot control by the control valve, with:

a throttle bore (6) that establishes a first fluid connection between an inlet (25) of the valve (100) to be pressurized and a piston chamber (21) of the working valve, and a working piston (2) with a first end face disposed opposite the piston chamber that is larger than a second end face disposed opposite the inlet (25), wherein the control valve is configured to open and close a second fluid connection (22, 23) between the piston chamber (21) and an outlet (24) of the valve (100), wherein the control valve further has:

a control valve seat (17), an anchor (5) that closes the second fluid connection (22, 23) together with the control valve seat (17) when pressed onto the control valve seat (17), a magnetizable core (35), a control spring (34, 34') that generates a force to define a longitudinal axis, a permanent magnet (29) disposed proximate the magnetizable core (35), a magnet holder (28) disposed between the permanent magnet (29) and the magnetizable core (35), and a control coil (26) configured to exert a magnetic force on the anchor (5), such that the control coil (26) lifts the anchor (5) from the control valve seat (17) to an extent that the second fluid connection (22, 23) allows a greater flow than the first fluid connection, wherein the control valve is configured to variably position the core (35) along the longitudinal axis defined by the force generated by the control spring (34, 34'), wherein the magnet holder (28) is configured to permit removal of the permanent magnet (29) from the magnet holder (28), and the permanent magnet (29) and the magnet holder (28) are positioned on the sectional valve (100) to be exposed to an environment surrounding the sectional valve (100), wherein, during an actuation state, the permanent magnet (29) is held in or on the magnet holder (28) so that the permanent magnet (29) is contiguous with the magnet holder (28), and the permanent magnet (29) is configured to hold the anchor (5), lifted from the control valve seat (17), indirectly by the magnetizable core (35), during an absence of the magnetic force exerted on the anchor (5) by the control coil (26), and wherein the permanent magnet (29) is removable from the magnet holder (28) so that the permanent magnet (29) is noncontiguous with the magnet holder (28), and the removed permanent magnet (29) allows the control spring (34, 34') to press the anchor onto the control valve seat (17) to terminate the actuation state.

3. The valve (100) according to claim 2, wherein the control valve is configured to generate a releasing magnetic field, which counteracts a retaining effect of the permanent magnet (29), wherein the control coil (26) or a releasing coil (27) are provided for generating the releasing magnetic field.

4. The valve (100) according to claim 3, wherein the releasing coil (27) is provided in the magnet holder (28) or on the permanent magnet (29).

5. The valve (100) according to claim 4, wherein the magnet holder (28) is removable from the sectional valve (100).

6. The valve (100) according to claim 2, wherein the core (35) is screwed, latched, clamped, bonded or positioned with spacers into a guide bushing (33) of the control valve.

7. The valve (100) according to claim 6, wherein the anchor (5) can be lifted off of the control valve seat (17) by partially unscrewing or loosening the core (35) from the guide bushing (33).

8. The valve (100) according to claim 6, wherein, during an absence of the magnetic force exerted on the anchor (5) by the control coil (26), the control valve is designed to screw or latch the core (35) into the guide bushing (33) with the permanent magnet (29) held in or on the magnet holder (28), to lift the anchor (5) held by the permanent magnet (29) indirectly via the core (35) from the control valve seat (17).

9. The valve (100) according to claim 2, further comprising:

a working valve seat (8), into which the working piston (2) can be pressed to separate the inlet (25) and outlet (24), wherein the working valve seat (8) can be moved along a working direction of the piston (2), wherein, at least with the inlet (25) pressurized and the working valve closed, the working valve seat (8)

is configured to be exposed to a valve seat force, and follows a movement of the working piston (2) with the working piston (2) pressed into the working valve seat (8).

10. The valve (100) according to claim 9, wherein the valve seat force can be produced by a working valve spring (10) or a difference in area between an end face of the working valve seat (8) relative to the working piston (2), and an end face of the working valve seat (8) relative to the inlet (25).

11. The valve (100) according to claim 2, further comprising:
- a fluid flow signal generator with a bushing (11) and a signal piston (13) guided in the bushing (11) with an outlet end face, to which the pressure prevailing in the outlet (24) of the valve (100) is applied,
- wherein the signal piston (13) is held in a resting position by a signal spring (15) in an unpressurized state, and
- the signal piston (13) extends outwardly through the bushing (11), so that a position of the signal piston (13) is discernible from outside, or
- the valve (100) has a detection means for detecting a predetermined deviation of the signal piston (13) from the resting position.

12. The valve (100) according to claim 11,
- wherein the signal piston (13), given an unpressurized outlet (24), can be moved through exposure to an outside force in the direction of the outlet (24) and/or opposite this direction to check the function.

13. The valve (100) according to claim 12,
- wherein signal piston (13) and signal spring (15) are dimensioned in such a way that the signal piston (13) comes to abut against the bushing (11) given a predetermined pressure in the outlet (24).

14. The valve (100) according to claim 11, wherein detection takes place by a closing and/or opening of a mechanical, electrical, magnetic and/or optical contact given at least the predetermined deviation of the signal piston (13) from the resting position.

15. The valve (100) according to claim 11,
- wherein the signal piston (13) has a seal (14) relative to the bushing (11), which is located between the outlet (24) and signal spring (15) and/or in an outer wall of the bushing (11).

16. An extinguishing system with an extinguishing agent line and a valve (100) according to claim 2.

17. The valve (100) according to claim 2, wherein the magnet holder (28) has a width relative to a longitudinal axis of the control valve that is greater than the width of the permanent magnet (29) relative to the longitudinal axis of the control valve.

* * * * *